C. WIELAND.
TIRE REPAIR TOOL.
APPLICATION FILED APR. 3, 1918.

1,288,340.  Patented Dec. 17, 1918.

Inventor
Charles Wieland

Witnesses

By Victor J. Evans
Attorney

UNITED STATES PATENT OFFICE.

CHARLES WIELAND, OF YANKTON, SOUTH DAKOTA.

TIRE-REPAIR TOOL.

1,288,340.

Specification of Letters Patent.  Patented Dec. 17, 1918.

Application filed April 3, 1918.  Serial No. 226,467.

*To all whom it may concern:*

Be it known that I, CHARLES WIELAND, a citizen of the United States, residing at Yankton, in the county of Yankton and State of South Dakota, have invented new and useful Improvements in Tire-Repair Tools, of which the following is a specification.

This invention is an improved tire tool for use especially in stretching and holding a part of the outer casing of a pneumatic tire to facilitate inspection or repair thereof, the object of the invention being to provide an improved tool of this character which is simple in construction, is efficient in operation, and which can be readily applied to and removed from a tire.

With the above and other objects in view, the invention consists in the construction, combination and arrangement of devices, hereinafter described and claimed.

In the accompanying drawing.

Figure 1:
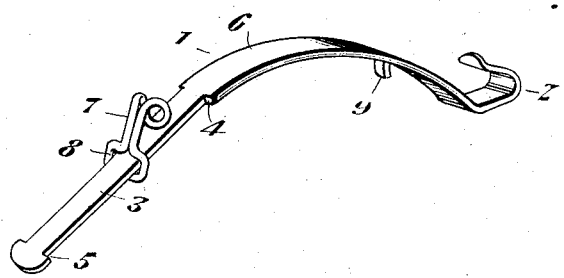
Figure 1 is a perspective view of a tire tool constructed and arranged in accordance with my invention.
Figure 2:
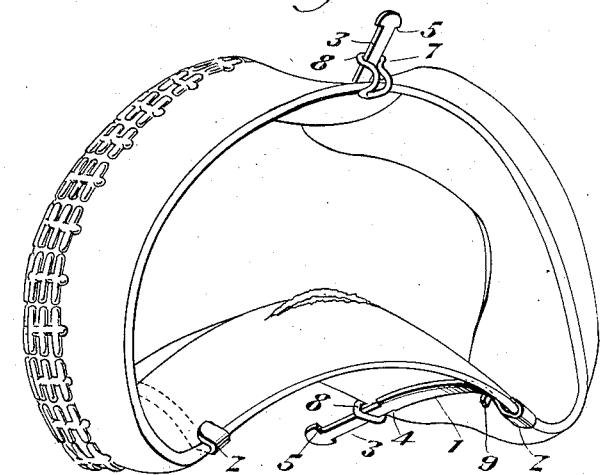
Fig. 2 is a similar view of the outer casing of a pneumatic tire and showing several of my tools applied thereto.
Figure 3:
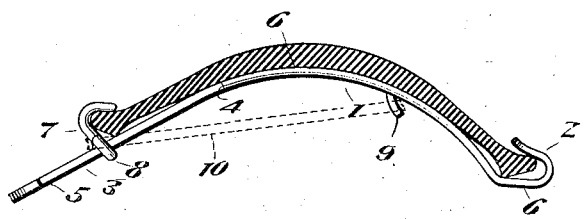
Fig. 3 is a transverse sectional view of the same showing the application of one of the tools to the outer tire or casing.

My improved repair tool is a longitudinal curved bar 1 of iron or steel which is formed at one end with a hook 2 to engage around one of the flanges of an outer tire casing. At the opposite end of the bar is an arm 3 which is somewhat narrower than the bar so that shoulders 4 are formed at the inner end of said arm, shoulders 5 being formed at the outer end thereof and at opposite sides. That side of the bar on which the hook 2 is arranged is flat as at 6 and is adapted to bear against the outer side of a tire casing, as shown in Figs. 2 and 3, when the tool is in use and said bar is arranged transversely of the casing and with its hook 2 engaged with one of the side flanges of the casing.

I also provide a hook 7 to engage the flange at the opposite side of the casing, said hook having an eye 8 at the inner end of its shank, the arm 3 of the bar extending through the said eye so that the hook 7 is slidably mounted on the arm of the bar and may be moved toward and from the fixed hook 2 as may be required by the width of the tire casing, so that the tool can be used on casings of various widths.

On the inner side of the bar 6 at a suitable distance from the hook 2 is a lug 9. A spring 10, which in practice may be a strong rubber band is attached to the said lug and also to the hook 7 and serves, in the event that the tire casing on which the device is being used is somewhat soft, to hold the hook 7 in place and prevent the hook from releasing its hold on the tire casing.

It will be understood, from the foregoing description, and by reference to the drawings, that when the tool is thus applied to a casing that portion of the casing to which the tool is applied is stretched and held firmly by the tool so that the stretched portion of the casing can be thoroughly inspected and repaired.

I claim:

1. A tire repair tool of the class described comprising a longitudinal curved bar having a fixed hook at one end on the convex side of the bar and provided at the opposite end with an extended arm, the curved portion of said bar being adapted to bear against and to stretch and hold a portion of a pneumatic tire when said bar is arranged transversely across the tire, and an adjustable hook slidably mounted on the said arm.

2. A tire repair tool of the class described comprising a longitudinal curved bar having a fixed hook at one end on the convex side of the bar and provided at the opposite end with an extended arm, the curved portion of said bar being adapted to bear against and to stretch and hold a portion of a pneumatic tire when said bar is arranged transversely across the tire, and an adjustable hook slidably mounted on the said arm, the said bar being flattened on its convex side, the said adjustable hook having an eye at the base of its shank through which said arm extends, so that said hook is slidable on the arm, said arm being formed with stops at its ends to limit the sliding movement of said hook.

3. A tire repair tool of the class described comprising a longitudinal curved bar having a fixed hook at one end on the convex side of the bar and provided at the opposite end with an extended arm, the curved portion of said bar being adapted to bear against and to stretch and hold a portion of a pneumatic tire when said bar is arranged transversely across the tire, an adjustable hook slidably mounted on the said arm and adapted to engage said tire, and a spring connected to the said adjustable hook and exerting its tension to draw the adjustable hook toward the fixed hook.

In testimony whereof I affix my signature.

CHARLES WIELAND.